United States Patent [19]

Ehrentraut et al.

[11] Patent Number: 4,538,929

[45] Date of Patent: Sep. 3, 1985

[54] HYDRODYNAMIC SLIDING SURFACE BEARING

[75] Inventors: Otto Ehrentraut, Gmunden; Ulf Ederer, Altmünster, both of Austria

[73] Assignee: Miba Gleitlager Aktiengesellschaft, Laakirchen, Austria

[21] Appl. No.: 531,912

[22] Filed: Sep. 12, 1983

[30] Foreign Application Priority Data

Sep. 20, 1982 [AT] Austria ................... 3490/82

[51] Int. Cl.³ ............................................. F16C 32/06
[52] U.S. Cl. ................................................... 384/120
[58] Field of Search ............... 384/120, 115, 113, 114, 384/398, 373

[56] References Cited

U.S. PATENT DOCUMENTS 2,070,115  2/1937  Crane ................................. 384/113
3,467,449  9/1969  Muijderman ...................... 384/120
3,503,658  3/1970  Remmers .......................... 384/113

FOREIGN PATENT DOCUMENTS 369145   4/1982  Austria .
2251637  5/1973  Fed. Rep. of Germany .

Primary Examiner—Lenard A. Footland
Attorney, Agent, or Firm—Collard, Roe & Galgano

[57] ABSTRACT

The friction conditions in a hydrodynamic surface bearing having a bearing metal layer in which no softer bearing metal is embedded are substantially improved in that the bearing surface is formed with grooves, which are distributed over the width of the bearing and include with the direction of movement in the bearing an angle not in excess of 20°. These grooves cooperate with the moving element to be received in the bearing so as to define passages which ensure that a minimum hydrodynamic pressure will be built up in the lubricant.

6 Claims, 6 Drawing Figures

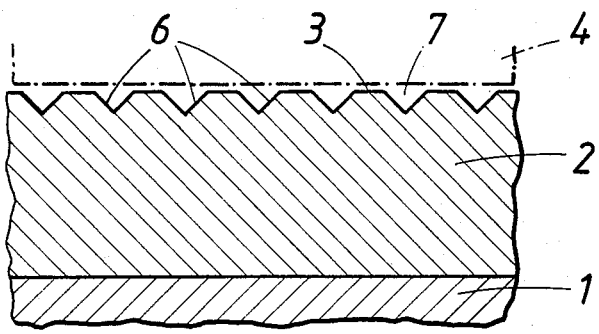
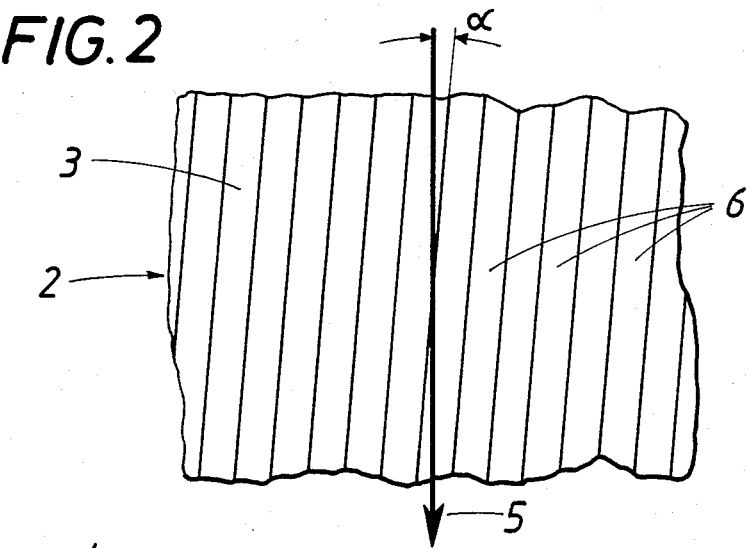
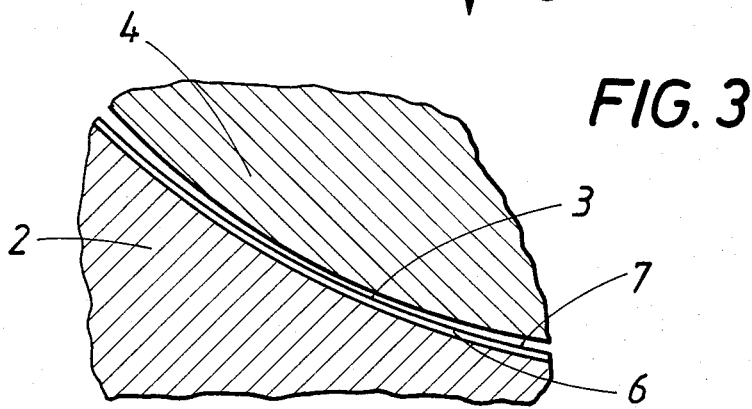

HYDRODYNAMIC SLIDING SURFACE BEARING

This invention relates to a hydrodynamic sliding surface bearing which has a bearing surface for receiving a moving element.

In order to improve the friction conditions and to increase the wear resistance of hydrodynamic sliding surface bearings, it has already been proposed in Laid-open German Application No. 22 51 637 to provide a bearing surface which is not formed by a continuous layer of a single bearing metal but in which a softer bearing metal is embedded in a layer of a harder bearing metal so that zones of harder and softer bearing metals alternate in the direction of movement in the bearing. That proposal was based on the concept that the harder bearing metal constitutes a carrying skeleton, which prevents an excessive transfer of the softer bearing metal to the friction surfaces, and that the protruding ribs formed by the carrying skeleton may be coated with a thin layer of the softer bearing metal because said ribs extend transversely to the direction of movement. But sliding surface bearings of that kind do not meet the expectations because the danger of a spreading of the softer bearing metal by rubbing cannot be reduced to a substantial degree. It is known from Austrian Patent Specification No. 369,145 that such sliding surface bearings can be improved in that the softer bearing material is embedded in grooves which are formed in the harder bearing metal and includes an angle below 15° with the direction of movement in the bearing and the spacing of the grooves does not exceed a predetermined distance so that a fine distribution of the softer bearing material over the width of the bearing surface is ensured. It has surprisingly been found that sliding surface bearings embodying said features meet all requirements because the fine distribution of the softer bearing material ensures a combination effect even in small areas as even in such small areas the properties of either material will not act alone and because the fact that the grooves extend substantially in the direction of movement in the bearing will ensure that foreign matter will remain embedded in the softer material rather than being forced into the harder bearing material, where the foreign matter could constitute imperfections which may give rise to local overstressing.

Whereas said known sliding surface bearings excellently meet all requirements, the embedding of a softer bearing material in the bearing metal layer involves a certain expenditure.

For this reason it is an object of the invention to provide a hydrodynamic sliding surface bearing in which the friction conditions are greatly improved without a need for embedding a softer bearing material in the bearing metal layer.

In accordance with the invention, this object is accomplished by forming grooves in the bearing surface, which are distributed over the width of the bearing surface and define an angle not in excess of 5° with the direction of movement, the grooves cooperating with the moving element to define lubricant passages in which the building up of a minimum hydrodynamic pressure is ensured.

It is surprising this improves the friction conditions because there is no doubt that the grooves in the bearing surface will disturb the uniformity of the lubricant film and its hydrodynamic carrying capacity. But the grooves in the bearing surface constitute relatively large flow passages for the lubricant so that lubricant can flow at a higher rate even through the narrowest gap filled with lubricant and the dissipation of heat, i.e., the cooling will be improved. The disadvantage which is due to the decrease of the hydrodynamic carrying capacity owing to the presence of the grooves is more than offset by the improved dissipation of the heat which is due to friction so that a hydrodynamic sliding surface bearing with surprisingly good friction conditions is provided. In that connection it must be borne in mind that even in case of mixed friction at least a major part of the locally generated heat can be dissipated by way of the lubricant which flows in the grooves in the bearing surface so that the lubricant will have a relatively low temperature and a high viscosity in the areas which are subjected to mixed friction. That high viscosity will improve the carrying capacity of the lubricant layer. It will be essential, of course, that the passages formed between the grooves in the bearing surface and the moving element which overlies said grooves must not prevent the building up of a hydrodynamic pressure. For this reason the cross-sectional shape and size of the grooves must be selected in dependence on the properties of the lubricant, the load on the bearing and the geometry of the gap filled with lubricant and in such a manner that a minimum hydrodynamic pressure can be built up in the lubricant between the bearing surface and the moving element received by said bearing surface. If the angle between the grooves in the bearing surface and the direction of movement does not exceed the stated limit the formation of a lubricant film will not be disturbed by edges which extend transversely to the direction of movement in the bearing. Besides, disturbances which might be due to an escape of foreign matter from the grooves will be prevented by the fact that the grooves extend substantially in the direction of movement in the bearing.

Because the grooves in the bearing surface are designed to improve the cooling, the grooves should be distributed over the width of the bearing surface with the smallest possible spacing so that the dissipation of heat will be improved by a flow of lubricant at a higher rate close to locations where a higher friction may occur. If the axial center spacing a of the grooves up to a maximum of 10 mm is smaller than or equal to an upper limit $$a_o = 200 + 0.5d + 0.006d^2$$

in micrometers, wherein d is the diameter of the bearing surface in millimeters, an adequate cooling can always be ensured if the cross-section of the grooves is properly selected. An improved heat dissipation will be obtained if the axial center spacing a of the grooves is less than an upper limit $$a_o = 150 + 0.3d + 0.001d^2$$

in micrometers, wherein d is the diameter of the bearing surface in millimeters.

If the axial center spacing of the grooves is less than a lower limit, the width of the grooves and the possible cross-section of the grooves will be so small that the cooling which can be achieved will be greatly reduced. For this reason the axial center spacing a of the grooves should be larger than or equal to a lower limit $$a_u = 10 + 0.1d$$

in micrometers, wherein d is the diameter of the bearing surface in millimeters. If the axial center spacing of the grooves is within said limits, the effect of the reduction of the hydrodynamic carrying capacity on the friction conditions can be more than offset by the dissipation of heat which can be achieved. This fact constitutes the advantage afforded by the bearings according to the invention over comparable bearings having a continuously smooth bearing surface.

To ensure an adequate flow of lubricant in the grooves in the bearing surface and the building up of a predetermined minimum hydrodynamic pressure in the lubricant, the ratio between the depth t and the width b of each groove should not be smaller than a certain limit. Conditions with which all requirements will be met will be obtained if the ratio of the depth t to the width b of the grooves is $$t/b \leq (1500-d)/1500$$

wherein d is the diameter of the bearing surface in millimeters. A desirable cross-sectional shape of the grooves will be obtained if the ratio of the width to the axial center spacing of said grooves is within a certain range. A favorable ratio of the width of the load-carrying lands between the grooves to the axial center spacing of the grooves will be achieved if the ratio of the land width (a−b) between two adjacent grooves to the axial center spacing of the grooves is less than or equal to an upper limit $$(a-b)/a = 100 - 6 v_u^{0.6} (\%)$$

wherein $v_u$ is the peripheral velocity of the moving element in $m.s^{-1}$.

The subject matter of the invention is illustrated by way of example in the drawings, in which FIG. 1 is an enlarged transverse sectional view showing a sliding surface bearing according to the invention;

FIG. 2 is a developed top plan view showing the bearing surface of the sliding surface bearing of FIG. 1;

FIG. 3 is a diagrammatic axial sectional view showing a portion of a radial bearing according to the invention.

Figure 4:
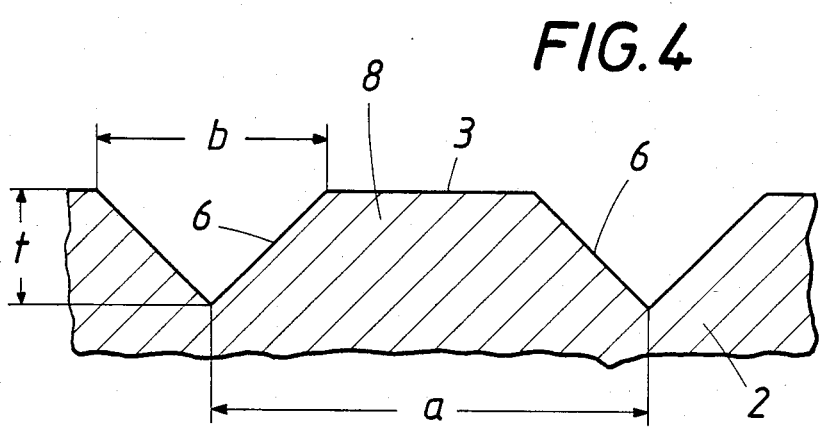
FIGS. 4 to 6 are enlarged transverse sectional views showing different cross-sectional shapes of grooves in the bearing surface.

In accordance with FIGS. 1 and 2, the hydrodynamic sliding surface bearing consists of a steel backing shell 1 and bearing surface layer 2 consisting of a bearing metal, e.g., of an aluminium alloy. The bearing metal layer 2 constitutes a bearing surface for supporting a moving element 4, which is indicated in phantom and which is driven to move over the bearing surface 3 in the direction of the arrow 5 in FIG. 2. Contrary to conventional sliding surface bearings of this kind, bearing surface 3 is not smooth but formed throughout its width with grooves 6 which define an angle α not in excess of 20° with the direction of movement 5. The grooves 6 may consist of one or more continuous grooves to facilitate the manufacture. Alternatively, the grooves 6 may consist of adjacent annular grooves which extend in the direction of movement 5 so that α=0°. α is preferably between 0° and 5°.

In order to insure that the result to be produced in accordance with the invention will be achieved, the angle α must not exceed the stated maximum and a minimum hydrodynamic pressure must be built up in the lubricant in the passages 7 defined by the grooves 6 and the moving element 4. This requirement imposes an upper limit on the cross-sectional area of the grooves 6 in the bearing surface 3. Whereas the grooves 6 will decrease the hydrodynamic carrying capacity of the lubricant layer between the bearing surface 3 and the moving element 4, such sliding surface bearings will be able to ensure more favorable friction conditions because lubricant can be fed at a higher rate in the grooves 6 so that the dissipation of heat can be increased and this will prevent an excessive temperature rise even in small areas. As there are no softer bearing materials embedded in the bearing metal layer 2 adjacent to the bearing surface 3, such softer bearing materials cannot adversely affect the wear resistance of the bearing so that favorable conditions will be obtained as regards the wear resistance and friction conditions.

In spite of the provision of a comparatively harder bearing material, such bearings will have favorable running-in properties owing to an improved dissipation of the heat generated in local areas in which stronger frictional forces are exerted. It will be understood that the running-in properties can be improved by the provision of a coating of a material which reduces friction and wear on the bearing surface.

FIG. 3 is a diagrammatical axial sectional view from which the conditions obtained by grooves 6 in a radial bearing are apparent. In the region in which the lubricant-filled gap has the smallest thickness, lubricant can flow at a higher rate owing to the provision of the passages 7 between the moving element 4 and the grooves 6 so that the desired cooling action will be ensured.

Because the result which may be produced in accordance with the invention depends on the dissipation of heat by the additional flow of lubricant in the grooves 6, the distribution of the grooves 6 over the width of the bearing surface 3 will be of special importance. That distribution may be defined by the axial center spacing a of the grooves 6. An adequate heat dissipation can be obtained if that axial center spacing a is below an upper limit, which depends on the diameter of the bearing surface.

Figure 5:
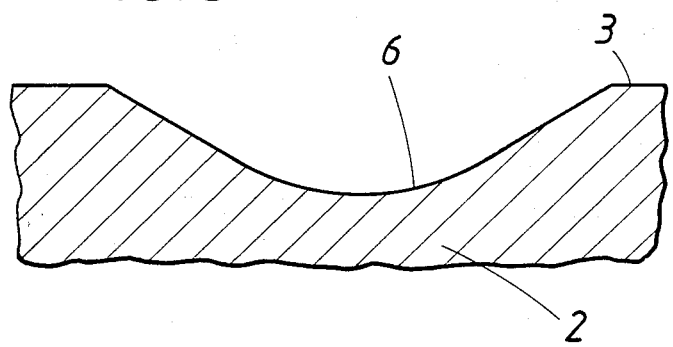
Figure 6:
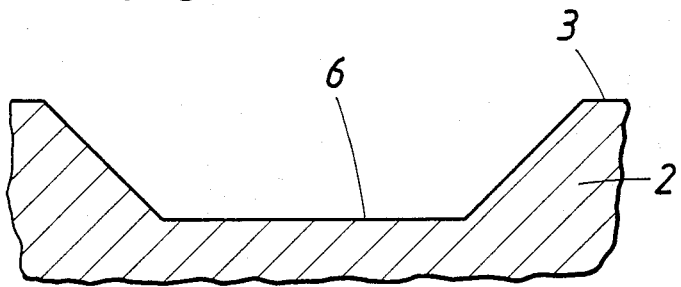

As is apparent from the illustrative embodiments shown in FIGS. 4 to 6, various cross-sectional shapes may be selected for the grooves 6 in the bearing surface 3. In order to ensure that the carrying capacity of the bearing surface will not be excessively reduced and that an adequate cooling will be effected, it is important that the ratio of the depth t to the width b of each groove in the bearing surface is within certain limits, which also depend on the diameter. In that connection the width of the lands 8 between the grooves 6 will also be significant because the heat must be transferred via said lands 8 to the lubricant flowing in the grooves 6. For this reason there is also an upper limit to the ratio of the land width (a−b), which is determined by the axial center spacing a and the width b of the grooves 6, and the axial center spacing a of the grooves 6 in order to ensure that an overloading of the bearing surface at hot spots can be avoided even under adverse friction conditions. For this reason the upper limit of said ratio will depend also on the peripheral velocity of the moving element 4.

Because the hydrodynamic pressure of the lubricant is generally less significant in thrust bearings than in radial bearings, different values can be selected for the minimum pressure which will be built up in spite of the passages 7, in dependence on the specific conditions in bearings of different types. This variation of the minimum pressure will obviously influence the cooling action. For this reason the geometric configuration and dimensions of the grooves 6 and their distribution over the width of the bearing surface may be selected so as to provide sliding surface bearings which are suitable for special load conditions.

What is claimed is:

1. In a hydrodynamic sliding surface bearing having a radially inwardly facing annular bearing surface adapted to be covered with a lubricant and to support a moving element movable relative to said bearing surface in a predetermined direction of movement, the improvement which comprises forming said bearing surface with a plurality of grooves extending in, and axially spaced apart transversely to, said longitudinal direction and defining an angle not in excess of 5° with said direction, the grooves cooperating with said moving element so as to define passages adapted to receive said lubricant and to ensure the building up of a minimum hydrodynamic pressure of the lubricant, and the axial spacing of said grooves being less than 10 mm and not in excess of an upper limit $$a_o = 200 + 0.5d + 0.006d^2$$

in micrometers, wherein d is the diameter of said bearing surface in millimeters.

2. The improvement set forth in claim 1, wherein the axial center spacing of said grooves is not in excess of an upper limit $$a_o = 150 + 0.3d + 0.01d^2$$

in micrometers, wherein d is the diameter of said bearing surface in millimeters.

3. The improvement set forth in claim 1, wherein the axial center spacing of said grooves is at least as large as a lower limit $$a_u = 10 + 0.1d$$

in micrometers, wherein d is the diameter of said bearing surface in millimeters.

4. The improvement set forth in claim 1, wherein the ratio of the depth t to the width b of said grooves amounts to $$t/b \leqq (1500 - d)/1500$$

wherein d is the diameter of said bearing surface in millimeters.

5. The improvement set forth in claim 1, wherein said moving element is rotatable relative to said bearing surface at a predetermined peripheral velocity, and comprising lands in said bearing surface between said grooves, the ratio of the width of said lands and the axial center spacing of said grooves not being in excess of an upper limit $$(a-b)/a = 100 - 6v_u^{0.6} (\%)$$

wherein a is the axial center spacing of said grooves, b is the width of said grooves, and $v_u$ is said predetermined design peripheral velocity.

6. The improvement set forth in claim 1, wherein said moving element is movable relative to said bearing surface at a predetermined velocity, and comprising lands in said bearing surface between said grooves, the ratio of the width of said lands and the center spacing of said grooves not being in excess of an upper limit $$(a-b)/a = 100 - 6v_u^{0.6} (\%)$$

wherein a is the center spacing of said grooves, b is the width of said grooves, and $v_u$ is said predetermined design velocity.

* * * * *